No. 629,818. Patented Aug. 1, 1899.
L. PYLE.
NUT LOCK WASHER.
(Application filed Feb. 4, 1899.)

(No Model.)

Witnesses
G. W. Simpkinson
Mary E. Niemar

Inventor
Liza Pyle
by E. C. Pyle
attorney.

UNITED STATES PATENT OFFICE.

LIZA PYLE, OF ROSS, KENTUCKY.

NUT-LOCK WASHER.

SPECIFICATION forming part of Letters Patent No. 629,818, dated August 1, 1899.

Application filed February 4, 1899. Serial No. 704,580. (No model.)

*To all whom it may concern:*

Be it known that I, LIZA PYLE, a citizen of the United States, residing at Ross, in the county of Campbell, State of Kentucky, have invented a new and useful Nut-Lock Washer, of which the following is a specification.

My invention relates to improvements in nut-lock washers in which the washer consists of a combination of rubber and metal of such a form and shape that when the same are joined together the rubber is firmly clamped within a metallic cup, thus constituting the washer, which when put in place over the bolt is so arranged as to make it stationary with reference to the revolutions of the nut. The rubber within the metallic cup is of that size and shape that when the nut is screwed home it will have embedded its corners in the rubber portion of the washer, so as to make it (the nut) permanently fixed in position.

The objects of my improvement are, first, to provide a nut-lock washer that will make a permanent lock for all nuts whenever and wherever used other than those used upon rail-joints in railroads, and, second, to provide such a nut-lock washer as will not interfere with the removal of the nut and at the same time operate as a perfect lock. I attain these objects by the mechanism illustrated in the accompanying drawings, in which—

Figure 1:
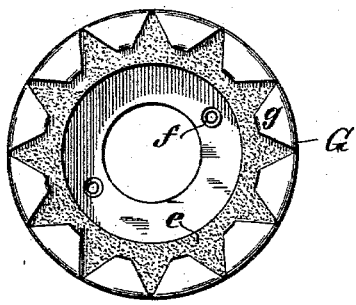
Figure 2:
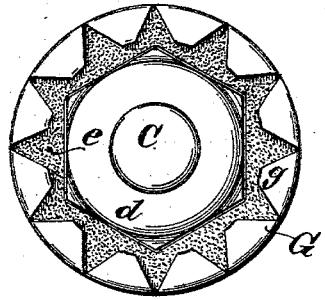
Figure 3:
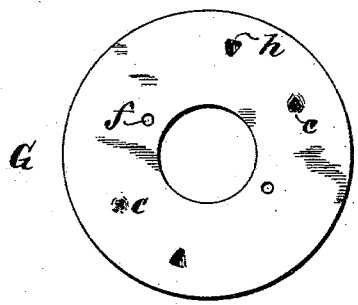
Figure 4:
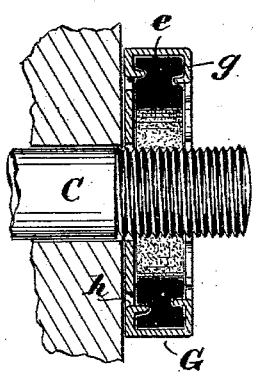
Figure 5:
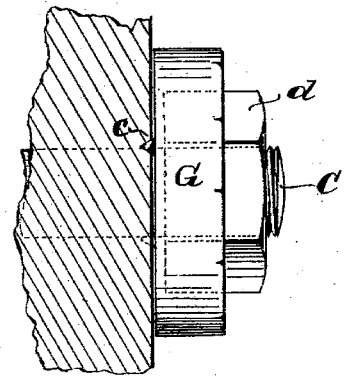

Figure 1 presents the front view of the washer; Fig. 2, the front view of the washer with the nut screwed home, illustrating how the corners of the nut embed themselves into the rubber; Fig. 3, the back of the washer, showing the projections and holes used for making the washer stationary about the bolt and the rear projections for holding the rubber firmly in the metallic cup. Fig. 4 shows a sectional view of the washer in place ready to receive the nut, also showing the manner by which the rubber is held firmly in the cup. Fig. 5 shows a side view of the entire washer in place with the nut screwed home, illustrating the extension of the nut above the washer and the projections from the base of the washer, by which means it is held stationary about the bolt.

Similar letters refer to similar parts throughout the several views.

The rubber $e$ and metallic cup G constitute the several parts of the washer, the rubber $e$ being made of such a size and shape as to fit snugly within the cup G and of such a width and depth as to give it resistance, (the depth to be governed by the depth of the nut to be used,) the rubber $e$ having an inner circumference the shortest diameter of which is equal to the shortest outer diameter of the nut $d$, so that the points of the nut $d$ when being screwed home will embed themselves into the rubber $e$, as shown in Fig. 2. The metallic cup G is made of some metallic substance, giving it strength and durability, having through its center a hole sufficiently large to pass over the bolt C. Through the base or back of the washer are beveled holes $f$, in which are inserted screws or nails, being driven into the wood or material that the washer rests against for the purpose of making the washer stationary about the bolt C. There extend from the back or base projections $c$, consisting of sharp points to be used in sinking them into iron or other substances that the washer may rest against to prevent it from revolving about the bolt C, as shown in Fig. 5.

Around the top of the cup G are the points $g$, which are of less length than the width of the rubber $e$, so that when they are bent down and sunken into the rubber $e$, as indicated in Figs. 1, 2, and 4, the rubber $e$ will be stationary within the cup G, and at the same time the points $g$ will not interfere with the corners of the nut $d$ embedding themselves into the rubber $e$. In the back of the metallic cup G are projections $h$, extending upward so as to sink themselves into the rubber $e$, thus giving additional firmness to the stationary position of the rubber $e$ in the cup G, as shown in Figs. 3 and 4.

The sides of the metallic cup G when the washer is completed for use are of as much less thickness or depth than the nut $d$ as will not interfere with the free use of the wrench upon the nut $d$, as shown in Fig. 5.

The washer when thus constructed and put in place over the bolt C, the points $c$ or screws through the holes $f$ being sunken into the material against which the washer rests, makes the washer stationary with respect to the motion of the nut $d$, whereas the corners of the nut $d$ when the nut is screwed home have embedded themselves into the rubber $e$, thus making for the nut $d$ a tight-fitting rubber jacket of the shape of the nut, as shown in Fig. 2, at the same time leaving enough of the nut exposed to permit the free use of the wrench, as shown in Fig. 5.

Having thus described my invention, that which I desire to secure by Letters Patent is—

The combination of the rubber $e$ with the metallic cup G held firmly together by the points $g$ and $h$, being sunken into the rubber $e$, the whole being so constructed that the shortest diameter of the inner circumference of the rubber $e$ will be equal to the shortest diameter of the outer circumference of the nut $d$, requiring the corners of the nut $d$ to embed themselves as the nut is being screwed home into the rubber $e$, thus making the tight-fitting jacket of the rubber $e$ about the nut $d$, at the same time the washer not interfering with the removal or tightening of the nut $d$, the washer having in its back the holes $f$ through which screws or nails may be inserted and the points $c$, both or either of which may be sunken into whatever the washer may rest against to prevent it from revolving about the bolt C.

LIZA PYLE.

Witnesses:
C. W. SIMPKINSON,
MARY E. NIEMAN.